United States Patent [19]

Morawetz

[11] 3,884,858

[45] May 20, 1975

[54] PROCESSING OF THERMOPLASTIC POLYESTERS

[75] Inventor: Gottfried Morawetz, Kufstein, Tirol, Austria

[73] Assignee: Ciba-Geigy Corporation, Basel, Switzerland

[22] Filed: Mar. 27, 1972

[21] Appl. No.: 238,642

[30] Foreign Application Priority Data
Mar. 20, 1971 Austria .................................. 2670/71

[52] U.S. Cl. ............ 260/29.15 B; 260/824; 260/873
[51] Int. Cl. ................................................ C08g 17/04
[58] Field of Search ........... 260/75 SB, 29.1 SB, 28, 260/824, 873

[56] References Cited
UNITED STATES PATENTS

| | | | |
|---|---|---|---|
| 3,140,268 | 7/1964 | Halpern et al. | 260/28 X |
| 3,193,516 | 7/1965 | Broatch et al. | 260/824 X |
| 3,405,198 | 10/1968 | Rein et al. | 260/873 |
| 3,516,957 | 6/1970 | Groz et al. | 260/40 R X |
| 3,563,941 | 2/1971 | Plueddemann | 260/208 |
| 3,660,557 | 5/1972 | Smith et al. | 260/28 X |

OTHER PUBLICATIONS

N. Nall, Chemistry and Technology of Silicones (1968), pp. 575-576, (TP245.SB.N6E-A.U.141).

Primary Examiner—Donald E. Czaja
Assistant Examiner—S. M. Person
Attorney, Agent, or Firm—Vincent J. Cavalieri

[57] ABSTRACT

The invention relates to the use of thermoplastic moulding materials based on saturated polyesters for moulding by processes in which the material comes into contact with heated metal surfaces while it is solidifying. The thermoplastic moulding materials according to the invention consist of
  a. a saturated polyester
  b. polydimethylsiloxanes and/or
  c. a synthetic wax.

5 Claims, No Drawings

PROCESSING OF THERMOPLASTIC POLYESTERS

This invention relates to the use of thermoplastic moulding materials based on saturated polyesters for moulding by processes in which the material comes into contact with heated metal surfaces while it is solidifying.

As is known, when thermoplastic polymers are processed by moulding techniques, difficulties tend to arise owing to the material adhering to the metal surfaces in the machine, which is especially apt to occur if the moulding comes into contact with metal surfaces heated to temperatures up to 200°C while it is solidifying.

In Japanese Patent 15192/69 additions of 0.1–10 weight percent of graphite or talc to the moulding material are suggested to overcome these difficulties and so improve the extrusion behaviour of glass-fibre reinforced saturated polyesters.

German Pat. No. 1,037,119 recommends the injection of a lubricant into the mould at high pressure to prevent the solidified material from sticking to the mould walls.

In the published German Patent Application No. 1,906,234 a process is described for improving the spinning properties of polyester melts, in which specified additives, among them dimethyl siloxane, are included in the melt as spinning assistants. As the melt is spun through nozzles, the material does not solidify until it is cooled in filament form after emerging from the machine. Spinning assistants should improve the flow properties of the melted material ant thus reduce the number of faults in the spun filament.

In moulding processes for polyesters in the amorphous state, on the contrary, certain areas of the moulded article are in contact with the walls of moulds which may be heated to temperatures from the freezing point of the polyester to 200°C. The purpose of the present invention is to prevent the occurence of such adhesion effects of the solidified amorphous parts of the moulding on the heated metal surfaces in the machine.

Thermoplastic moulding materials of the following composition have surprisingly been found as particularly suitable for moulding on screw type extrusion machines:

a. linear saturated polyesters from aromatic dicarboxylic acids and optionally small amounts of aliphatic dicarboxylic acids with saturated aliphatic, cycloaliphatic or aromatic diols, b. polydimethyl siloxanes having a viscosity of 35 to 200 cSt, preferably 60 to 120 cSt, in amounts of 0.25 to 0.8 weight percent, preferably 0.4 to 0.6 weight percent, in relation to the weight of the polyester, and/or c. a synthetic wax, e.g. one produced by the Ziegler process, with a solidification point at 109°–113°C, a molecular weight of about 1,600 and a viscosity of 110–130 cp at 150°C, in amounts of 0.5 to 6 weight percent, preferably 1 to 4 weight percent, in relation to the weight of the polyester.

Further, it has been found that moulding materials as defined herein can be processed with very good results by the injection and injection-blow mouldidng techniques as well as by extrusion moulding. In the processing of moulding materials according to this invention by the three named techniques, adhesion effects between the solidified material and the heater metal surface of the machine were virtually absent, which ensured a smooth flow of work and a considerably improved technical parameter of the moulding process. In addition the surface characteristics of the mouldings, which included semi-finished and final products, were improved by the use of the described moulding materials. In cases where an addition of the component (c) in the upper region of the given concentration range was necessary, the mouldings formed with the materials displayed substantially higher resistance to impact in the notched bar test. Other types of polydimethyl siloxanes and synthetic waxes proved to be unsuitable under economical processing conditions.

Moulding materials especially suitable for use according to this invention are polyesters and copolyesters, the acid component of which consists to at least 80 mol percent of terephthalic acid residues and the diol component of aliphatic or cycloaliphatic diols having 2 to 10 carbon atoms.

Examples of copolyesters suitable for processing in accordance with the invention are those whose acid component, in addition to terephthalic acid residues, contains isophthalic, 2,6-naphthalene dicarboxylic, 4,4'-diphenyl dicarboxylic or aliphatic dicarboxylic acid residues, and whose diol component contains ethylene glycol, 1,4-butane-diol, 1,4-bis-(hydroxymethyl)-cyclohexane, 2,2'-bis-[p-($\beta$-hydroxyethoxy)-phenyl]-propane or trimethylhexane diol-1,6 residues.

The copolyesters may contain further up to 1 mol percent of a more than bifunctional crosslinking acid or alcohol component. To the moulding materials may be added, for instance, pigments, fillers and reinforcing additives such as glass fibres, stabilizers and flame inhibitors.

Suitable polyesters and copolyesters are obtained, for example, by the transesterification of dialkyl esters of dicarboxylic acids with diols in the presence of known, freely selected transesterification catalysts containing, e.g. calcium, lithium, sodium, magnesium, zinc, cobalt and/or manganese, followed by condensation polymerization in the normal manner using any of the known catalysts for this purpose, e.g. antimony, lead, titanium and/or germanium, until the desired intrinsic viscosity is reached. Processes of this type are described, for example, in British Pat. No. 1,210,884, U.S. Pat. No. 2,965,613 and the published German Patent Application No. 1,569,591.

The following Examples illustrate the invention without limiting its scope.

EXAMPLE 1

Polyethylene terephthalate moulding material with an intrinsic viscosity of 1.20 dl/g containing 0.5 weight percent of polydimethyl siloxane of 100 cSt viscosity was extruded in a screw type extruder at 15 atmospheres excess pressure in the form of circular rod of 50 mm diameter. The mould of the extruder was set at 280°C, the oil-heated section of the former of 70 mm length was maintained at 135°C and the water-cooled section of 360 mm length at 15°C. The material could be extruded with ease and the rod was of homogeneous structure with a faultless surface and was free from cavities.

Comparative trials with polyethylene terephthalate moulding material containing 0.5 weight percent of polydimethyl siloxane of 1,000 cSt viscosity gave unsatifactory results.

EXAMPLE 2

Polyethylene terephthalate moulding material with an intrinsic viscosity of 1.19 dl/g to which 3 weight percent of a synthetic wax (solidification point 109°–113°C, molecular weight 1,600, viscosity at 150°C 110–130 cp) had been added, was extruded in a screw type machine at 15 atmospheres excess pressure as circular rod of 50 mm diameter. The mould temperature was set at 280°C, the oil-heated section of the former was 70 mm long and held at 135°C, while the water-cooled section of 360 mm length was at 15°C. The material proved readily extrudable and gave rod which was of homogeneous structure, with no cavities and a surface free from imperfections.

A comparative polyethylene terephthalate moulding material containing 3 weight percent of a synthetic wax having a solidification point at 92°–96°C, a molecular weight of 700 and a viscosity of 12 cp at 120°C gave unsatisfactory results.

EXAMPLE 3

Polyethylene terephthalate moulding material of 1.22 dl/g intrinsic viscosity containing 0.35 weight percent of polydimethyl siloxane (viscosity 100 cSt) and 0.25 weight percent of a synthetic wax (solidification point 109°–113°C, molecular weight 1,600, viscosity at 150°C 110–130 cp) was extrusion moulded on a screw type machine at 15 atmospheres excess pressure in the form of circular rod of 50 mm diameter. The extruder mould was maintained at 280°C, the oil-heated, 70 mm section of the former at 135°C and the water-cooled section of 360 mm length at 15°C. The material was well extrudable and the rod was of homogeneous structure, free from cavities and surface faults.

EXAMPLE 4

Polyethylene terephthalate moulding material having an intrinsic viscosity of 1.02 dl/g, containing additions of 0.5 weight percent of a synthetic wax (solidification point 109°–113°C, molecular weight 1,600, viscosity at 150°C 130 cp) and 0.5 weight percent of polydimethyl siloxane (viscosity 100 cSt) was injection moulded in the form of 12 star-shaped mouldings with the dimensions 50 × 6 × 4 mm. The mould temperature was 145°C and the residence time of the material in the mould 50 seconds. The mouldings could be ejected from the mould without difficulty, whereas mouldings of a material without the aforenamed additives stuck firmly to the mould wall.

EXAMPLE 5

Two batches of polyethylene terephthalate moulding material containing respectively 3.5 weight percent and 12 weight percent of a synthetic wax (solidification point 109°–113°C, molecular weight 1,600, viscosity at 150°C 110–130 cp) were processed on a screw type injection moulding machine in the form of 12 star-shaped mouldings with the dimensions 50 × 6 × 4 mm. The mould temperature was 145°C and the residence time in the mould 30 seconds. Ejection from the mould presented no difficulty. In the notched-bar test for resistance to impact according to German Industrial Standard 53.453 the following values were obtained:

| Weight % of synthetic wax | Intrinsic viscosity Moulding material | Moulding | Impact resistance kp cm/cm$^2$ GIS 53.453 |
|---|---|---|---|
| 3 | 1.32 | 1.08 | 8.88 |
| 5 | 1.35 | 1.08 | 9.06 |
| 12 | 1.15 | 1.00 | 4.80 |

In contrast, mouldings of a material of 1.08 dl/g intrinsic viscosity and without the synthetic wax additive reached values of only 4.5 kg cm/cm$^2$ for resistance to impact in this test.

EXAMPLE 6

A copolyester moulding material of an intrinsic viscosity of 1.00 dl/g containing 7.5 mol percent of 2,2-bis-[p-($\beta$-hydroxyethoxy)-phenyl]-propane residues and with an addition of 0.75 weight percent of polydimethyl siloxane of 100 cSt viscosity was processed on an injection and blow moulding machine of standard design. The barrel temperatures were: feed section 270°C, middle section 290°C, ejection section 300°C. The injection mould and the blow pin were set at ascending temperature from 75° to 90°C from the bottom to the neck of the hollow article. The blow mould was water cooled. A mould with a blow pin of 20 mm diameter was used in which bottles were formed with the dimensions: external diameter 35 mm, neck diameter 23 mm, height 83 mm, wall thickness of the blow moulded part 0.9 mm. The residence time of the premoulding in the injection mould was 6 seconds, the time in the blow mould 8 seconds. The bottles showed no tendency to stick to the mould walls. They showed slight, uniform opacity and had very good service properties.

EXAMPLE 7

Polyethylene terephthalate moulding material of 1.20 dl/g intrinsic viscosity containing 0.25 weight percent of a synthetic wax (solidification point 109°–113°C, molecular weight 1,600, viscosity 130 cp at 150°C) and 0.75 weight percent of a polydimethyl siloxane (viscosity at 25°C 100 cp) was melted in an extruder at 280°C and extruded through a slot die. On extrusion it was conveyed to a three-roll mill with rolls heated to 160°, 150° and 190°C in the direction of transportation, on which 4 mm thick sheeting was formed at a draw-off speed of 1 m/min. There was no interference with the flow of production and the sheeting was of homogeneous crystalline structure with an impeccable surface.

Polyethylene terephthalate of the same intrinsic viscosity but without the additives was processed in the form of sheeting by the same system, but the attempt was unsuccessful because the extruded material could not be satisfactorily detached from the folls of the mill.

Comparably good results to those of the foregoing Examples are obtained using polydimethyl siloxanes with viscosities of 40 and 180 cSt.

The intrinsic viscosity was determined with 1 percent solutions of the polyester in 100 ml of a mixture of equal parts of phenol and tetrachlorethane at 25°C.

Having thus described the invention, what I claim is:

1. A process of molding saturated polyester by contacting a liquid composition with a heated metal surface during solidifying said composition consisting essentially of a. linear saturated polyester from aromatic dicarboxylic acid and
b. polydimethyl siloxane having a viscosity of 35 to 200 cSt, in an amount of 0.25 to 0.8 weight percent in relation to the weight of the polyester, or
c. a synthetic wax produced by the Ziegler process with a solidification point at 109°–113°C, a molecular weight of about 1,600 and a viscosity of 110–130 cp at 150°C, in an amount of 0.5 to 6 weight percent in relation to the polyester, and
d. mixtures of (a), (b) and (c).

2. The process of claim 1 wherein said polyester is polyethylene terephthalate.

3. The process of claim 2 wherein said siloxane has a viscosity of 60 to 120 cSt and said siloxane is present at 0.4 to 0.6 weight percent.

4. The process of claim 2 wherein said synthetic wax is present at 1 to 4 weight percent.

5. The product produced by the process of claim 1.

* * * * *